US010192011B2

(12) United States Patent
Lynch et al.

(10) Patent No.: US 10,192,011 B2
(45) Date of Patent: Jan. 29, 2019

(54) METHOD AND APPARATUS FOR WAVE FIELD ESTIMATION

(71) Applicant: SPAWAR Systems Center Pacific, San Diego, CA (US)

(72) Inventors: Stephen Dennis Lynch, San Diego, CA (US); Daniel Jay Alford-Lago, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 196 days.

(21) Appl. No.: 15/399,163

(22) Filed: Jan. 5, 2017

(65) Prior Publication Data

US 2018/0189430 A1    Jul. 5, 2018

(51) Int. Cl.
  *G01S 19/07*    (2010.01)
  *G06F 17/11*    (2006.01)
  *G06F 17/50*    (2006.01)

(52) U.S. Cl.
  CPC .......... *G06F 17/5009* (2013.01); *G06F 17/11* (2013.01); *G01S 19/07* (2013.01); *G06F 2217/16* (2013.01)

(58) Field of Classification Search
  CPC .. G06F 17/5009; G06F 17/11; G06F 2217/16; G01S 3/74
  USPC ........................................................... 703/2
  See application file for complete search history.

(56) References Cited

U.S. PATENT DOCUMENTS

2007/0139269 A1* 6/2007 Chen ...................... G01S 5/0252
                                                              342/450

OTHER PUBLICATIONS

R. Michael Jones & Judith J. Stephenson; A Versatile Three-Dimensional Ray Tracing Computer Program for Radio Waves in the Ionosphere; NTIA Technical Report OT-75-76, Oct. 1975.
D. B. Sailors; HF Sky-Wave Field Strength Predictions; Technical Report 1624, Sep. 1993.
Henry Weinberg & Ruth Eta Keenan; Gaussian ray bundles for modeling high-frequency propagation loss under shallow-water conditions;J. Acoust. Soc. Am. 100 (3), Sep. 1996.

* cited by examiner

*Primary Examiner* — Saif A Alhija
(74) *Attorney, Agent, or Firm* — SPAWAR Systems Center Pacific; Kyle Eppele; J. Eric Anderson

(57) ABSTRACT

A method for estimating wave field characteristics in 3D comprising the following steps: using a ray trace model to estimate RF wave front paths as they propagate from a transmitter to a plurality of given points within a geographical area of interest; constructing a ray bundle for each point; sorting the points into mode constellations according to the points' hop count and apogee characteristics; constructing a Delaunay triangulation of each mode constellation; computing a covariance estimation for each triangle in each mode constellation; and estimating the wave field characteristics over the entire geographical area of interest based on a summation of constituent ray bundles' characteristics within each mode constellation.

18 Claims, 5 Drawing Sheets

METHOD AND APPARATUS FOR WAVE FIELD ESTIMATION

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 104014.

BACKGROUND OF THE INVENTION

This invention relates to the field of estimating radio frequency (RF) wave field characteristics in three dimensions (3D). Using existing point-to-point ray tracing programs to model the propagation of RF energy over a wide area is computationally expensive and has inherent limitations. For example, in refractive waveguides, ray treatments can result in caustics, where infinite rays cross the same focus points, leading to the incorrect calculation that the field intensity is infinite at those points (i.e., singularities). Less extreme issues arise from the infinitesimal nature of the ray paths, even without the occurrence of caustics. It is difficult to estimate wave intensity, for instance, in areas where the incidence of rays is sparse, as neighboring rays may have originated from very different initial angles, and may have very different phase paths, as a result. Such cases can arise because of the non-linearity of propagation through the refractive medium, or they may arise because of how the model was implemented by the user. There exists a need for a better way of estimating 3D, RF wave field characteristics.

SUMMARY

Disclosed herein is a method and apparatus for estimating wave field characteristics in 3D. A method embodiment of the invention comprises the following steps. The first step provides for using a 3D ray trace model to estimate RF wave front paths as the RF wave fronts propagate through Earth's atmosphere from a transmitter to a plurality of given points within a geographical area of interest. The 3D ray trace model also estimates each point's phase path, group path, apogee, and hop count. The next step provides for constructing a ray bundle for each point. Each ray bundle has a center axis, a polarization that varies along the bundle's axis, and a field amplitude that varies as a two-dimensional Gaussian curve with distance from the bundle's center axis. The next step provides for sorting the points into mode constellations according to the points' hop count and apogee characteristics. The next step provides for constructing a Delaunay triangulation of each mode constellation. The next step provides for computing a covariance estimation for each triangle in each mode constellation. Nearest neighbor points in the Delaunay triangulation are included in the covariance estimation, and the semi-major and semi-minor axes of each ellipse respectively define characteristic scales of the ray bundles' Gaussian cross-section and orientation in space. The next step provides for estimating the wave field characteristics over the entire geographical area of interest based on a summation of constituent ray bundles' characteristics within each mode constellation.

The apparatus for estimating wave field characteristics in 3D is described herein as comprising a human-readable display and a processor. The processor is communicatively coupled to the display and comprises a 3D ray trace model configured to output an estimate of RF wave front paths as the RF wave fronts propagate through Earth's atmosphere from a transmitter to a plurality of given points within a geographical area of interest. The 3D ray trace model also estimates each point's phase path, group path, apogee, and hop count. The processor is configured to perform several functions. First, the processor is configured to construct a ray bundle for each point. Next, the processor is configured to sort the points into mode constellations according to the points' hop count and apogee characteristics. Next, the processor is configured to construct a Delaunay triangulation of each mode constellation and then to compute a covariance estimation for each triangle in each mode constellation. The processor is also configured to estimate the wave field characteristics over the entire geographical area of interest based on a summation of constituent ray bundles' characteristics within each mode constellation, and to display the estimated wave field characteristics on a map of the geographical area of interest.

Also described herein is another method embodiment for estimating wave field characteristics in 3D comprising the following steps. In this embodiment, the first step provides for inputting RF transmitter characteristics into a processor. The next step provides for inputting propagation medium characteristics into the processor. The next step provides for identifying a geographical area of interest. The next step provides for tracing in 3D a plurality of ray paths from the transmitter to corresponding intersection points on the area of interest. The next step provides for generating a separate constellation of points for intersection points having the same mode of transmission. The next step provides for using Delaunay triangulation to create a triangulation mesh for each constellation of points. The next step provides for constructing a Gaussian ray bundle from each ray path. Each Gaussian ray bundle comprises a plurality of Gaussian functions centered on a corresponding ray wherein differences in depth between neighboring rays is represented by a 2×2 matrix that represents the variance of rays distributed around the corresponding ray. The next step provides for coherently summing the constituent ray bundles at a given intersection point for each constellation of points. The next step provides for determining a phase-coherent channel response of the propagation medium to RF transmissions from the transmitter over the entire area of interest based on the coherent sum of constellation points for each mode.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and apparatus below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
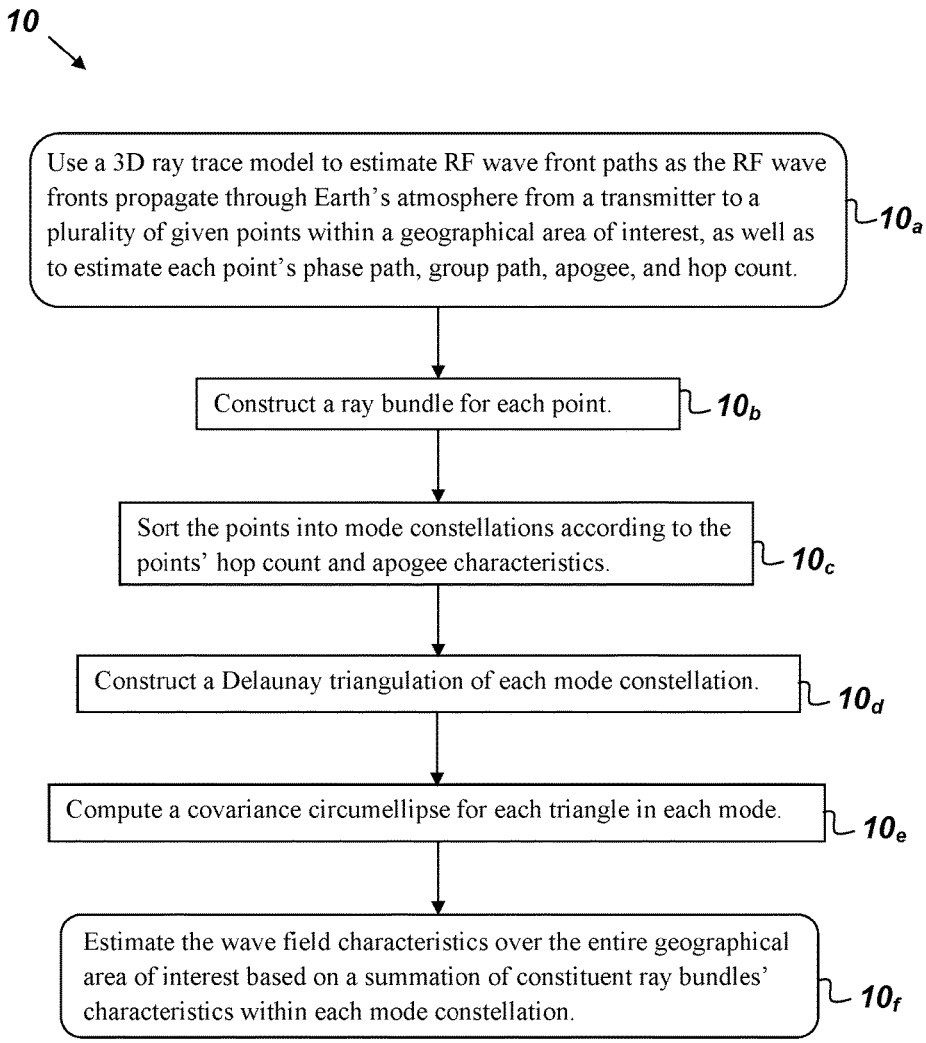
FIG. 1 is a flowchart of a method for estimating wave field characteristics in three dimensions.

FIG. 1 is a flowchart of a method 10 for estimating wave field characteristics in 3D that comprises, consists of, or consists essentially of the following steps. The first step $10_a$ provides for using a 3D ray trace model to estimate RF wave front paths as the RF wave fronts propagate through Earth's atmosphere from a transmitter to a plurality of given points within a geographical area of interest, as well as to estimate each point's phase path, group path, apogee, and hop count. The next step $10_b$ provides for constructing a ray bundle for each point. Each ray bundle has a center axis, a polarization that varies along the bundle's axis, and a field amplitude that varies as a two-dimensional Gaussian curve with distance from the bundle's center axis. The next step $10_c$ provides for sorting the points into mode constellations according to the points' hop count and apogee characteristics. The next step $10_d$ provides for constructing a Delaunay triangulation of each mode constellation. The next step $10_e$ provides for computing a covariance estimation for each triangle in each mode constellation. Nearest neighbor points in the Delaunay triangulation are included in the covariance estimation, and the semi-major and semi-minor axes of each ellipse respectively define characteristic scales of the ray bundles' Gaussian cross-section and orientation in space. The next step $10_f$ provides for estimating the wave field characteristics over the entire geographical area of interest based on a summation of constituent ray bundles' characteristics within each mode constellation.

Method 10 may be used to estimate wave field characteristics for high frequency (HF) (i.e., 3-30 megahertz) waves that interact with the ionosphere. The ionosphere is formed by a balance of ionizing solar radiation and energetic particles and the collision/recombination of oppositely charged constituents. As such, the ionosphere is an extremely dynamic medium whose properties including free electron densities, temperature, and shear vary on a wide range of both temporal and spatial scales. The HF band coincides with the critical plasma frequency of the peak free electron densities in the ionosphere, thus it marks the transition between RF signals that are completely trapped due to refraction from the conductive ionosphere and higher frequencies that completely penetrate and are far less affected by the presence of free electrons. As such, HF waves can propagate immense distances around the globe, but are sensitive to variability in the propagation medium. As used herein, the propagation medium is the Earth's atmosphere.

Wave field estimation method 10 calls for using a 3D ray trace model. Any 3D ray trace model that is capable of estimating RF wave front paths as the RF wave fronts propagate Earth's atmosphere may be used. Propagation models exist which capture the physics of RF propagation, including the anisotropic nature of the propagation medium, which is the result of the earth's background magnetic field, as well as the interactions between the medium and the propagating signals, which can result in rotation of the polarization of the propagating signals. A suitable example of a 3D ray trace model is, but is not limited to, the Jones-Stephenson ray trace model, which is described in the Department of Commerce technical report, "A versatile three-dimensional ray tracing computer program for radio waves in the ionosphere", by R. Michael Jones and Judith J. Stephenson, 1975, which report is incorporated by reference herein.

Wave field estimation method 10 is able to estimate wave field characteristics in three dimensions over large areas faster than current point-to-point methods for calculating the wave fields from a source or set of sources, in order to estimate channel response at HF. Wave field parameters/characteristics that can be estimated by wave field estimation method 10 include phase, vector intensity, and polarization of HF skywave signals, i.e. signals that are refracted by the earth's ionosphere. The field contribution from a given propagating mode, source, frequency, and at a given point in space, is the sum of contributions from ray bundles surrounding the point, within a specified distance threshold that can be adjusted according to the application. The results may be combined to estimate phase-coherent channel response, such as a communications link with fading or radar system, or a non-coherent field, such as the ambient noise field, or any combination thereof.

The following discussion is of an embodiment of the wave field estimation method 10 that assumes HF propagation in the earth-ionosphere waveguide. As input, this embodiment of method 10 requires the full list of points at which rays computed by the 3D ray trace model intersect the area of interest. The area of interest may be any large area such as an ocean surface, a continent, a country's territory, a city, a hemisphere, etc. The area of interest may be an area at, above, or below sea level. In addition to the location of each intersection point, this embodiment of the method 10 requires the phase- and group-path lengths, apogee, number of reflections off the earth's surface (hop count), initial and final elevation and azimuthal angles, frequency and Doppler shift, and transverse and longitudinal complex polarizations—and are all estimated by the ray trace model. Ray bundles may then be constructed such that field amplitude varies as a two dimensional (2D) Gaussian curve with distance from the bundle's center axis. Gaussian ray bundles are described in an article titled "High-frequency wave field estimation using Gaussian ray bundle superposition on Delaunay triangulation" by D. J. Alford-Lago and S. D. Lynch (published in 2016 IEEE-APS Topical Conference on Antennas and Propagation in Wireless Communications (APWC)), which article is incorporated by reference herein in its entirety.

Figure 2:
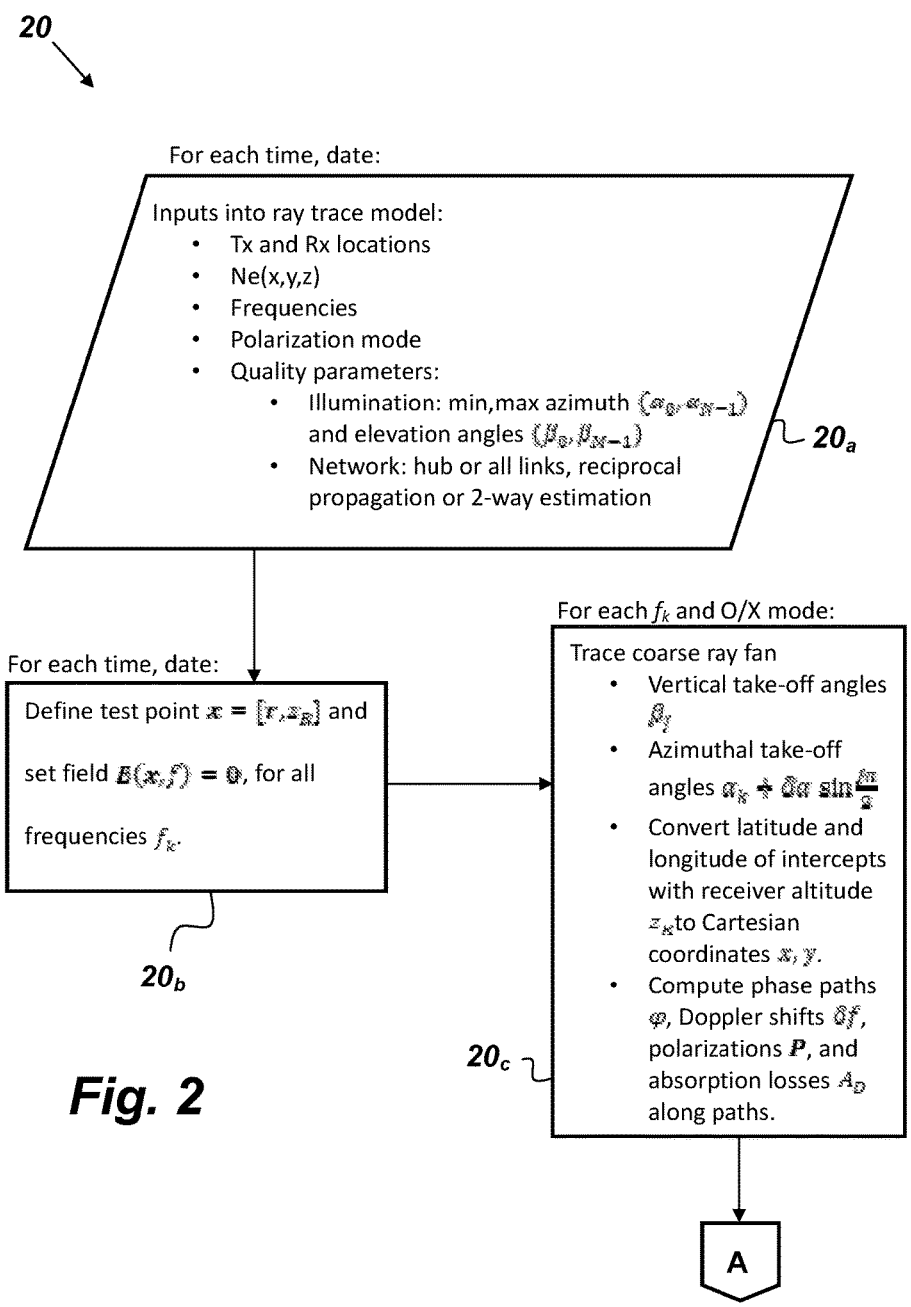
FIGS. 2-3 are a flowchart of a method for estimating wave field characteristics in three dimensions.
Figure 3:
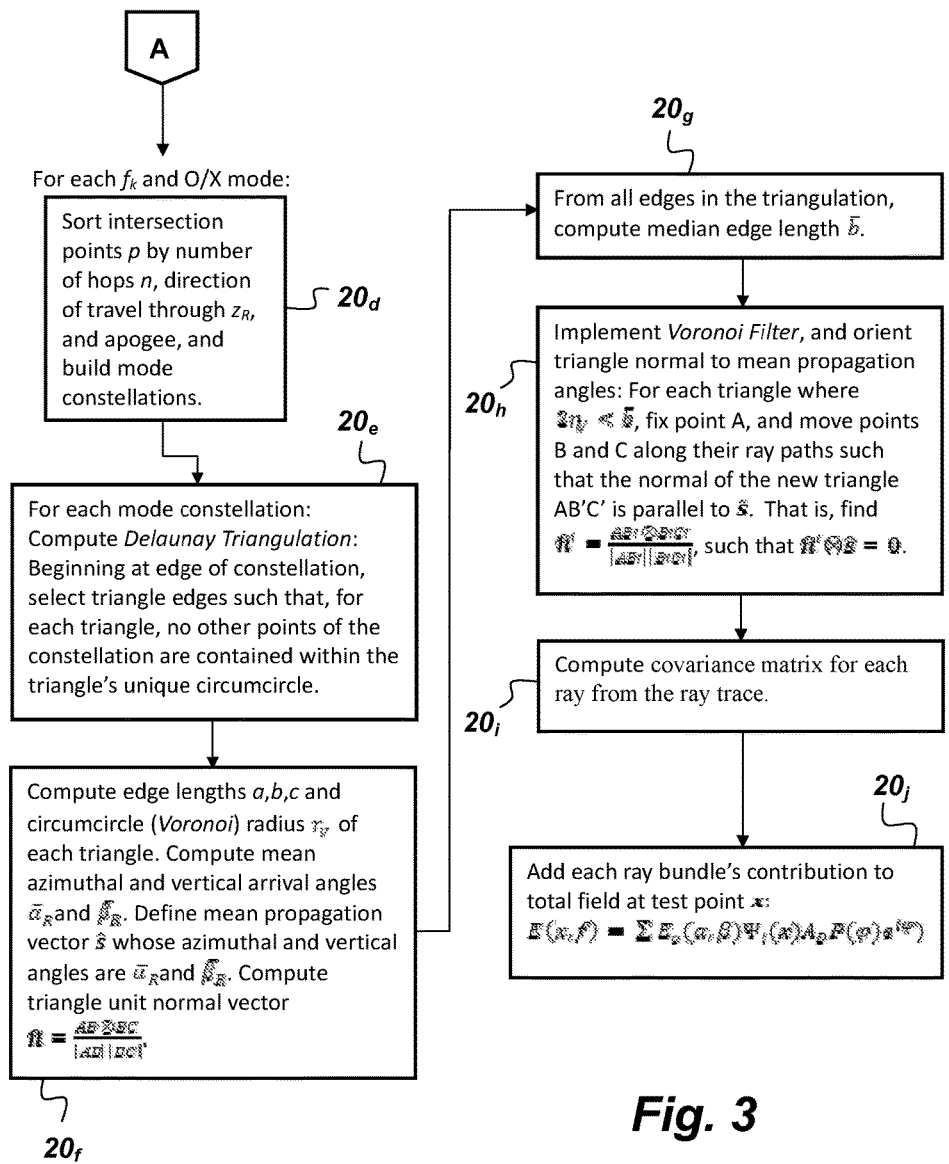

FIGS. 2-3 represent a flow diagram illustrating an example embodiment 20 of the wave front estimation method 10. The first step $20_a$ calls for inputting information into the ray trace model for each time/date for which the field strength is to be estimated. Such information may include transmitter and receiver locations, and time- and space-dependent index of refraction Ne(x,y,z,t), frequencies f, polarization mode (O/X: ordinary or extraordinary), and quality parameters such as wide-area Illumination (e.g., min, max azimuth ($\alpha_0,\alpha_{N-1}$) and elevation angles ($\beta_0,\beta_{M-1}$)), and Network (e.g., hub or all links, reciprocal propagation or 2-way estimation). The next step $20_b$ is to define test point x=[r,$z_R$], where r is position in the horizontal plane, and $z_R$ is receiver height, and set field E(x,$f_k$)=0, for all frequencies $f_k$ for each time/date. Next, in step $20_c$ a coarse ray fan is traced for each O/X mode and for each frequency $f_k$, starting from the transmitter location $xx_T$=[$r_T,z_T$]. This is done by: computing the vertical take-off angles $\beta_j$, the azimuthal take-off angles $$\alpha_k + \delta\alpha \sin\frac{j\pi}{2}$$

(here δα is an angle offset intended to reduce the likelihood that the triangles formed by neighboring ray points are zero-area, which happens if the ray points are collinear); converting latitude and longitude of intercepts with receiver altitude $z_R$ to Cartesian coordinates x, y; and computing phase paths φ, Doppler shifts δf, polarizations P, and absorption losses $A_D$ along paths. The next step $20_d$ provides for sorting the points p by mode, using the hop count n and apogee for each O/X mode and for each frequency $f_k$. Here, apogee may be used to decipher from which ionosphere layer (D, E, F, F1/F2) a given ray reflected, and a percent difference in reflection height may be used to define the threshold between modes. Each subset of points corresponding to one mode (e.g., 2 hops reflecting from E-layer is 2E, and 1 hop reflecting off F2 is 1F2) is called a mode constellation. Additionally, if the receiver altitude $z_R$ is positive (i.e., above sea or ground level), sign of the vertical propagation angle at the point may be used as a mode identification parameter. FIGS. 2-3, steps $20_e$-$20_j$ are performed for each mode constellation. Ray initial angles may be staggered such that vertices near the transmitter are non-collinear.

Figure 4:
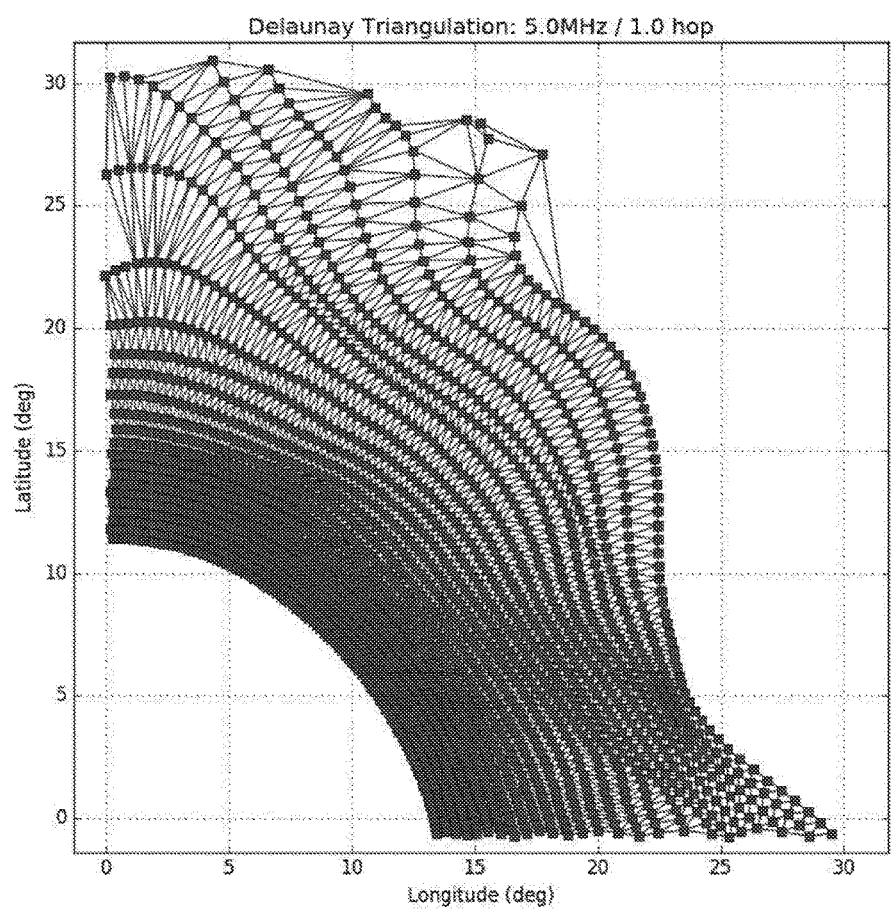
FIG. 4 is a Delaunay Triangulation graph.

FIG. 4 is an example of a Delaunay Triangulation graph. Step $20_e$ (See FIG. 3) provides for computing a Delaunay Triangulation by beginning at an edge of a constellation, and selecting triangle edges such that, for each triangle in the resulting graph of triangles, no other points of the constellation are contained within the triangle's unique circumcircle.

Figure 5:
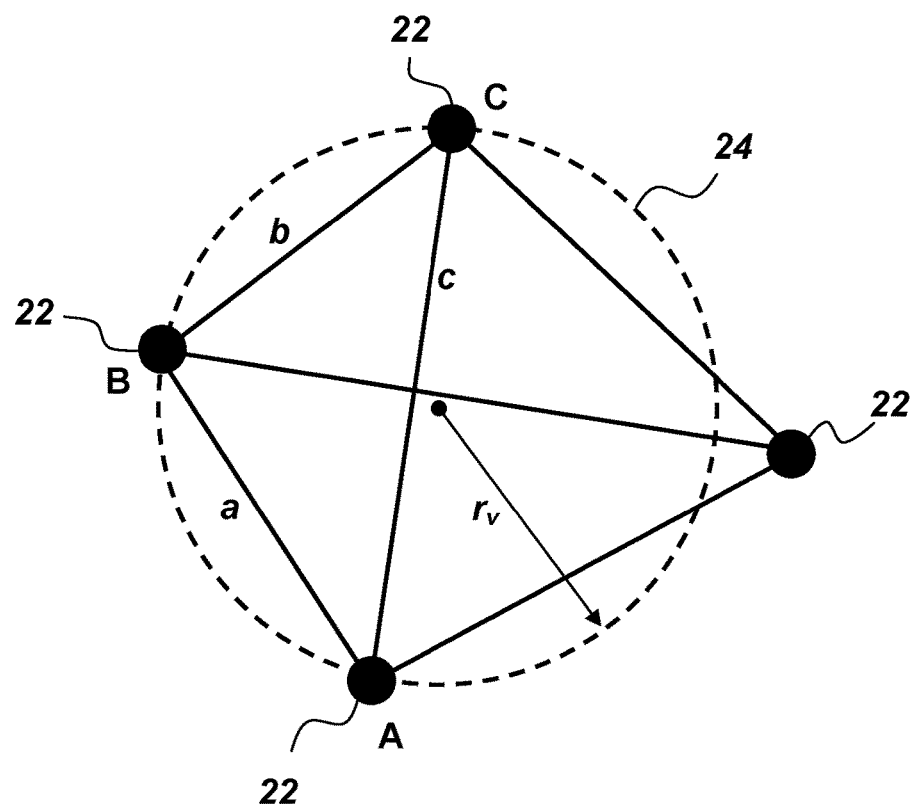
FIG. 5 is an illustration depicting points interconnected by lines to form triangles.

FIG. 5 is an illustration depicting four intersection points 22 interconnected by black solid lines to form triangles. Each triangle fits within a circumcircle such as circumcircle 24 that surrounds triangle ABC. The radius $r_V$ of each circumcircle is called the Voronoi radius. Step $20_f$ provides for computing edge lengths a, b, c and circumcircle radius $r_V$ of each triangle and for computing mean azimuthal and vertical arrival angles $\overline{\alpha}_R$ and $\overline{\beta}_R$. Step $20_f$ also provides for defining a mean propagation vector ŝ whose azimuthal and vertical angles are $\overline{\alpha}_R$ and $\overline{\beta}_R$ and for computing a triangle unit normal vector $$\hat{n} = \frac{AB \otimes BC}{|AB||BC|}.$$

Step $20_g$ provides for computing the median edge length $\overline{b}$ for the graph from all edges in the triangulation. For each triangle where $2r_V < \overline{b}$, step $20_h$ provides for (1) implementing a Voronoi Filter, and (2) orienting each triangle normal to mean propagation angles. Step $20_h$ may be accomplished for each triangle by fixing point A, and moving points B and C along their ray paths such that the normal of the new triangle AB'C' is parallel to ŝ. That is, find $$\hat{n}' = \frac{AB' \otimes B'C'}{|AB'||B'C'|},$$

such that ñ'⊗ŝ=0. Thus, those triangles whose Voronoi radii are longer than 2b are eliminated. This filtering ensures that triangles whose vertices are not nearest neighbors, such as along the edges of the area of interest, do not contaminate the field estimates anywhere. Moreover, both the Voronoi filter and mode sorting ensure that the progression of phase across the surface of interest is smooth, and is not adversely affected by artifacts associated with the way the propagation model was initiated.

In the next step $20_i$ of the example embodiment 20 of the wave front estimation method 10, illustrated in FIGS. 2-3, a covariance matrix is computed for each ray from the ray trace. That is, for ray $r_i$—representing the center of a 2-dimensional Gaussian function—the covariance matrix is determined by the neighbors of $r_i$, which are any rays from the Delaunay triangulation that share an edge with $r_i$. The eigenvalues of this covariance matrix define the shape and orientation of the cross-section of the ray tube centered at $r_i$. A scale factor corresponding to the spreading loss of each bundle may be computed as the ratio of the eigenvalues of the constituent rays some small, fixed distance from the transmitter (which in this embodiment is set to 1 km) to the area of the final eigenvalues at the altitude of interest (e.g., receiver altitude). This can all be represented by the following equation:

$$\Psi_i(x) = \frac{\alpha_i \Gamma_i \delta(x-r_i)}{\sqrt{2\pi}\,|\Sigma_i|^{\frac{1}{2}}} \exp\left[-\frac{1}{2}(x-r_i)^T \sum_i^{-1}(x-r_i)\right] \quad (1)$$

Where $\Psi_i(x)$ is the function defining the spreading loss for ray $r_i$ at some point x. And $$\alpha_i = \frac{\lambda_1' \lambda_2'}{\lambda_1 \lambda_2},$$

the ratio of the product of the eigenvalues of the covariance matrix ($\Sigma_i$) for the neighbors of $r_i$ as seen near the transmitter ($\lambda_1', \lambda_2'$) and near the receiver ($\lambda_1, \lambda_2$). The δ(x) is a Dirac measure such that $$\delta(x-r_i) = \begin{cases} 1 & \text{if } \|x-r_i\| < \eta \\ 0 & \text{otherwise} \end{cases} \quad (2)$$

This turns the function off once sample points (x) reach sufficient distance η from the center of the Gaussian bundle $r_i$ to have any real contribution to that particular ray tube. Finally, $\Gamma_i$ accounts for volume attenuation and losses at boundary reflections; these values are recorded in the ray trace output. The polarization of each ray bundle may be assumed to be the sum of the polarizations of the constituent rays estimated by the propagation model.

Step $20_j$ provides for adding each ray bundle's contribution to total field at test point x:

$$E(x,f) = \Sigma E_o(\alpha,\beta)\Psi_i(x)A_D P(\varphi)e^{i\varphi} \quad (3)$$

Wave field estimation method 10 has the ability to estimate properties of transverse electromagnetic waves in 3D, including complex polarization, vector intensity, phase- and group-path lengths, angles of arrival, and hop count. Wave field estimation method 10 can compute the above quantities, even in cases where propagation is such that incident rays are sparse. As such, method 10 may be used for a number of applications such as: channel response estimation, point-to-point estimates, as for communications applications, and wide-area illumination problems, as for radar and point-to-area communication applications. Method 10 is computationally fast and utilizes algorithms which were developed for computational efficiency. Method 10 removes some artifacts that may arise from user implementation of the propagation model. Because Gaussian functions have support everywhere, the cross sections of ray bundles, and by extension individual ray paths, is infinite, though diminishing with distance from the ray path, whereas previously cross sections of ray paths were infinitesimal. As a result, contributions to field at any given point include those associated with many surrounding ray paths, rather than just single nearest or nearest pair. An additional result of method 10 is that the wave field in shadow zones (areas of sparse energy radiation) is finite and non-zero.

Method 10 may include the additional step of iteratively adjusting the range and spacing of initial take-off angle inputs of the HF rays in order to "land" a ray in the desired area. However, the refractive profile often leads to a non-linearity, where small changes in take-off angle lead to wildly different ray paths, especially near the medium's critical angles.

Instead of computing a covariance circumellipse for each triangle in each mode, a Steiner circumellipse (i.e., smallest area circumellipse) may be found for each triangle. The semi-major and semi-minor axes of each ellipse may be used to define the characteristic scales of the ray bundles' Gaussian cross-sections, as well as the Gaussian function's orientation in space. The spreading loss of each bundle may be equated to the ratio of the area of the Steiner ellipse of the three constituent rays some small, fixed distance from the transmitter (which in this embodiment is set to 1 km) to the area of the final Steiner ellipse at the altitude of interest (e.g., receiver altitude). In more detail, the Steiner circumellipse alternative step provides for computing the smallest circumellipse for tilted triangle AB'C', and computing semi-major and semi-minor axis vectors $c_R$ and $d_R$, centroid g, and the projection $g_R$ of g along $\hat{s}$ to the $z_R$ plane. Then semi-major and semi-minor axis vectors c and d of the Steiner ellipse may be computed of the triangle formed by points where the same three rays (i.e., rays on which points A, B, C, B' and C' all lie) intersect a one km-radius sphere encapsulating the transmitter's location. In this embodiment, spreading loss $A_S$ is proportional to the ratio of the initial and final Steiner ellipses, and falls off with the distance from the test point x to the center axis of the ray bundle:

$$A_s = \frac{cd}{c_R d_R} e^{-[(x-g_R)\cdot d_R]^2 - [(x-g_R)\cdot c_R]^2} \quad (4)$$

Here $c_R=|c_R|$, $d_R=|d_R|$, etc., and $H(x,g_R)=1-\text{Heaviside}(m(x-g_R))$ limits the range of influence of the bundles (m real, ~8). Then each ray bundle's contribution may be added to total field at test point x:

$$E(x,f)=\Sigma E_o(\alpha,\beta) A_S A_D P(\varphi) e^{i\varphi} H(x,g_R) \quad (5)$$

From the above description of the wave field estimation method 10, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

We claim:

1. A method for estimating wave field characteristics in three dimensions (3D) comprising the following steps:
    using a 3D ray trace model to estimate radio frequency (RF) wave front paths as the RF wave fronts propagate through Earth's atmosphere from a transmitter to a plurality of given points within a geographical area of interest, wherein the 3D ray trace model also estimates each point's phase path, group path, apogee, and hop count;
    constructing a ray bundle for each point, wherein each ray bundle has a center axis, a polarization that varies along the bundle's axis, and a field amplitude that varies as a two-dimensional Gaussian curve with distance from the bundle's center axis;
    sorting the points into mode constellations according to the points' hop count and apogee characteristics;
    constructing a Delaunay triangulation of each mode constellation;
    computing a covariance estimation for each triangle in each mode constellation, wherein nearest neighbor points in the Delaunay triangulation are included in the covariance estimation, and the semi-major and semi-minor axes of each ellipse respectively define characteristic scales of the ray bundles' Gaussian cross-section and orientation in space;
    estimating the wave field characteristics over the entire geographical area of interest based on a summation of constituent ray bundles' characteristics within each mode constellation; and
    adjusting an RF transmitter to compensate for atmospheric conditions based on the estimated wave field characteristics.

2. The method of claim 1, wherein the summation is coherent.

3. The method of claim 1, wherein the summation is incoherent.

4. The method of claim 1, wherein the RF wave fronts are high frequency (HF) (3 to 30 megahertz) wave fronts and the HF wave fronts propagate through the Earth's ionosphere.

5. The method of claim 4, wherein for each point, the 3D ray trace model also estimates the intersection location, initial and final elation and azimuthal angles, frequency and Doppler shift, and transverse and longitudinal complex polarizations.

6. The method of claim 4, wherein each point's apogee is used to decipher from which ionosphere layer a corresponding ray reflected, and wherein a percent difference in reflection height is used to define a threshold between modes.

7. The method of claim 6, wherein the wave field characteristics include phase, vector intensity, and polarization of HF skywave signals.

8. The method of claim 1, further comprising the following steps:
    calculating, for each mode constellation, a median edge length of the triangles in the Delaunay triangulation; and
    eliminating triangles in a given mode constellation having a circumcircle radius that is greater than two times the median edge length of the given mode constellation.

9. The method of claim 1, further comprising the step of displaying the estimated wave field characteristics on a map of the geographical area of interest.

10. The method of claim 9, further comprising the step of identifying on the map areas of limited RF wave front propagation.

11. A method for estimating wave field characteristics in three dimensions (3D) comprising the following steps:
   inputting radio frequency (RF) transmitter characteristics into a processor;
   inputting propagation medium characteristics into the processor;
   identifying a geographical area of interest;
   tracing in 3D a plurality of ray paths from the transmitter to corresponding intersection points on the area of interest;
   generating a separate constellation of points for intersection points having the same mode of transmission;
   using Delaunay triangulation to create a triangulation mesh for each constellation of points;
   constructing a Gaussian ray bundle from each ray path, wherein each Gaussian ray bundle comprises a plurality of Gaussian functions centered on a corresponding ray wherein differences in depth between neighboring rays is represented by a 2×2 matrix that represents the variance of rays distributed around the corresponding ray;
   for each constellation of points, coherently summing the constituent ray bundles at a given intersection point;
   determining a phase-coherent channel response of the propagation medium to RF transmissions from the transmitter over the entire area of interest based on the coherent sum of constellation points for each mode; and
   adjusting the RF transmitter characteristics to account for propagation medium conditions based on the determined phase-coherent channel response of the propagation medium.

12. The method of claim 11, further comprising the step of filtering the triangulation by eliminating triangles in a given mode constellation that have a dimension that is greater than a threshold.

13. The method of claim 12, wherein the RF wave fronts are high frequency (HF) (3 to 30 megahertz) wave fronts and the HF wave fronts propagate through the Earth's ionosphere.

14. The method of claim 13, wherein for each point, the 3D ray trace model also estimates the intersection location, initial and final elation and azimuthal angles, frequency and Doppler shift, and transverse and longitudinal complex polarizations.

15. The method of claim 14, wherein each point's apogee is used to decipher from which ionosphere layer a corresponding ray reflected, and wherein a percent difference in reflection height is used to define a threshold between modes.

16. The method of claim 13, wherein the wave field characteristics include phase, vector intensity, and polarization of HF skywave signals.

17. The method of claim 11, further comprising the step of displaying the estimated wave field characteristics on a map of the geographical area of interest.

18. The method of claim 17, further comprising the step of identifying on the map areas of limited RF wave front propagation.

* * * * *